(12) United States Patent
Hanjagi et al.

(10) Patent No.: US 7,870,871 B1
(45) Date of Patent: Jan. 18, 2011

(54) INLET ORIFICE FOR A FUEL PRESSURE DAMPER

(75) Inventors: Mahesh Nagesh Hanjagi, Yorktown, VA (US); Rodney Crispen, Yorktown, VA (US); David Humblot, Newport News, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 0 days.

(21) Appl. No.: 12/711,286

(22) Filed: Feb. 24, 2010

(51) Int. Cl.
*F16L 55/04* (2006.01)

(52) U.S. Cl. .............................. 138/30; 138/31; 138/26; 220/721; 303/87

(58) Field of Classification Search .................. 138/31, 138/30; 303/87, 113.1, 115, 1; 220/720
See application file for complete search history.

(56) References Cited

U.S. PATENT DOCUMENTS

| | | | |
|---|---|---|---|
| 4,281,679 A * | 8/1981 | Stearns ..................... 137/515.5 |
| 5,058,961 A * | 10/1991 | Mergenthaler et al. ... 303/115.4 |
| 5,265,943 A * | 11/1993 | Kehl et al. ..................... 303/87 |
| 5,618,085 A * | 4/1997 | Siegel et al. ............. 303/113.1 |
| 5,664,848 A * | 9/1997 | Muraski ....................... 303/87 |
| 5,857,753 A * | 1/1999 | Gowda ..................... 303/116.4 |
| 5,951,121 A * | 9/1999 | Takahashi .................... 303/155 |
| 6,003,555 A * | 12/1999 | Sheng .......................... 138/31 |
| 6,203,117 B1* | 3/2001 | Starr et al. ..................... 303/87 |
| 6,390,133 B1* | 5/2002 | Patterson et al. .............. 138/31 |

* cited by examiner

*Primary Examiner*—Patrick F Brinson

(57) ABSTRACT

A fuel pressure damper (10') includes a housing (15) defining an inlet (46) constructed and arranged to receive fuel. An orifice disc (54) is provided at the inlet and includes at least one orifice (58). A cover (22) is coupled to the housing. A flexible diaphragm (12) has a periphery fixedly secured to at least the housing or the cover and has a freely movable central portion (36). A compression spring (14) biases the diaphragm to a normal position. In an operating position, the central portion of the diaphragm alone, or in combination with the spring, is constructed and arranged to dampen fuel pressure pulsations at the inlet. The orifice is constructed and arranged to ensure that pressure pulsations of a certain magnitude are prevented from entering the damper and damaging the diaphragm.

20 Claims, 1 Drawing Sheet

INLET ORIFICE FOR A FUEL PRESSURE DAMPER

FIELD

The invention relates to fuel supply systems and, more particularly, to a fuel pressure damper that includes an inlet orifice providing a tuned pressure drop to dampen high frequency or high amplitude pressure pulsations and thus protects the damper from damage.

BACKGROUND

Conventional fuel delivery systems in the automotive industry require an energy absorbing device to mitigate fuel pressure pulsations and/or audible noise generated in the system on the low pressure fuel supply side of a high pressure fuel pump. With reference to FIG. 1, this energy absorbing device, commonly known as a fuel pressure damper 10, has a diaphragm 12 loaded by a spring 14 to dampen fuel pulsations. The central portion of the diaphragm 12 rests on a spacer 16. The damper 10 typically has a large inlet opening 18 or inlet diameter that leaves the diaphragm and spring system inside the damper vulnerable to the fuel pressure fluctuations of pulsation. When exposed to above-normal fuel pulsations, the diaphragm and spring system can experience permanent damage leading to reduced damping performance and eventual failure as a damper. Thus, the large inlet diameter limits the operating range of the damper.

Conventional fuel pressure dampers can be tuned to only a limited operating range. These dampers thus help to minimize the pressure pulsation problem in only one range, but are exposed to a wide range of pressure pulsations that can damage the damper. The limitations of conventional dampers arise from the fixed, large size inlet opening.

Thus, there is a need to provide a fuel pressure damper that can be tuned to protect the damper by providing an additional pressure drop, preventing damaging fuel pressure pulsations from acting on the diaphragm.

SUMMARY

An objective of the present invention is to fulfill the need referred to above. In accordance with the principles of an embodiment, this objective is obtained by providing a fuel pressure damper including a housing defining an inlet constructed and arranged to receive fuel. An orifice disc is provided at the inlet and includes at least one orifice there-through. A cover is coupled to the housing to define an interior space. A flexible diaphragm has a periphery fixedly secured to at least the housing or the cover and has a freely movable central portion that divides the interior space into first and second isolated chambers. The at least one orifice communicates with the second chamber. A compression spring is provided in the first chamber and is disposed between the spring receiving structure and the cover. The spring biases the spring receiving structure and thus the diaphragm to a normal position thereby defining a volume in the second chamber. In an operating position, the central portion of the diaphragm alone, or in combination with the spring, is constructed and arranged to dampen fuel pressure pulsations in the second chamber by varying the volume of the second chamber. The at least one orifice is constructed and arranged to ensure that pressure pulsations of a certain magnitude are prevented from entering the second chamber.

In accordance with another aspect of the invention, a method prevents certain magnitude fuel pressure pulsations from entering a fuel pressure damper of a vehicle fuel system. The method provides a fuel pressure damper having an inlet and an orifice disc at the inlet. The orifice disc includes at least one orifice there-through. A size and length of the at least one orifice is selected to create a pressure drop at the inlet to prevent the certain magnitude fuel pressure pulsations from entering the damper.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
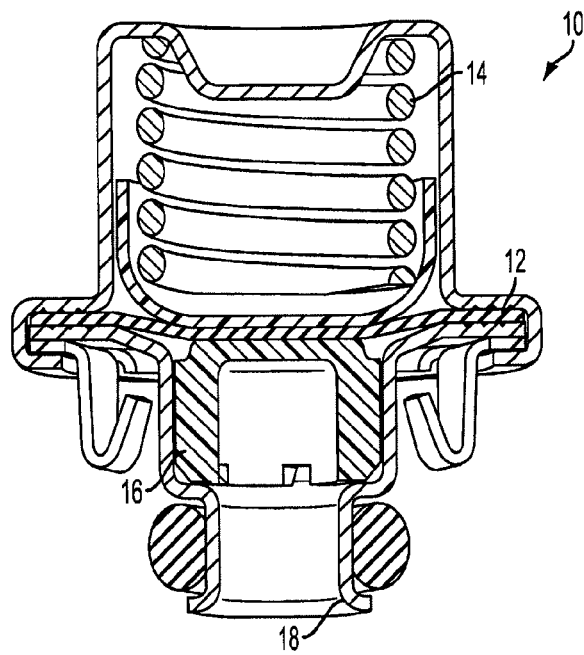
FIG. 1 is a sectional view of a conventional fuel pressure damper having a large inlet opening.
Figure 2:
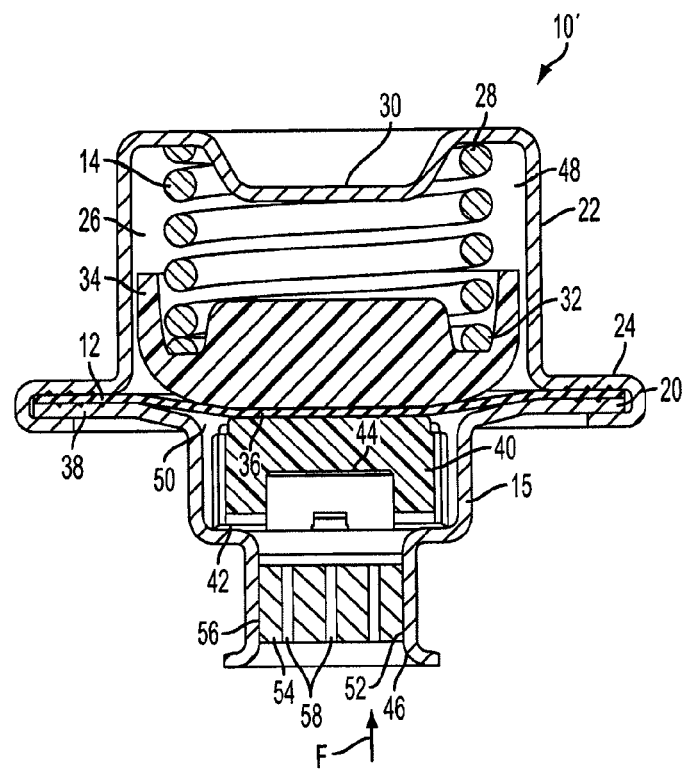
FIG. 2 is a view of the fuel pressure regulator according to an embodiment of the invention.

With reference to FIG. 2, a fuel pressure damper is shown generally indicated at 10'. The damper 10' is employed in a fuel system of an internal combustion diesel engine and direct gasoline engines. Low pressure at a fuel supply side to high pressure at a fuel pump side creates undesired propagation waves or fuel pressure pulses which generate noise during normal operation of a vehicle. The damper 10' dampens these fuel pressure pulsations as explained more fully below.

The damper 10' includes a housing 15 having an annular flange 20. The flange 20 is secured to a cover 22 by a fold of the cover to form an annular shoulder 24 engaging the flange 20. The shoulder 24 acts as an anchor for the damper 10' during assembly with a fuel system. It can be appreciated that the flange can be provided on the cover 22 with the shoulder being provided on the housing 15. The housing 15 and cover 22 define an interior space 26.

A compression spring 14 is disposed in the interior space 26. A first end 28 of the spring 14 is held against a detent 30 in the cover 22. A second end 32 of the spring 14 is received in a spring receiving structure, preferably in the form of a spring cup 34. The spring cup 34 is engaged with an upper surface of a freely movable central portion 36 of a flexible, generally flat diaphragm 12. The spring cup 34 ensures that the spring force is distributed evenly on the diaphragm 12 and also ensures that the end 32 of the spring 14 does not contact and damage the diaphragm 12. The diaphragm 12 preferably includes nitrile rubber and/or other flexible material suitable for contact with fuel. An annular periphery 38 of the diaphragm 12 is secured to at least the cover 22 or the housing 15. In the embodiment, the periphery 38 of the diaphragm 12 is fixedly secured (e.g., sandwiched) between the flange 20 and shoulder 24. The central portion 36 of the diaphragm 12 rests on a spacer 40 which in turn rests on interior surface 42 of the housing 15 in a normal position of the damper 10'. The spacer includes a bore 44 to permit the flow of fluid F there-through that is received at inlet 46 of the housing 15.

The diaphragm 12 extends radially and divides the interior space 26 into an upper chamber 48 and a lower chamber 50, isolated from the upper chamber 48. While the upper chamber 48 houses the spring 14 and spring cup 34, the lower chamber 50 provides the means of interaction between fuel and the diaphragm 12. The spring loaded diaphragm 12 keeps the system in equilibrium against fuel pressure pulsations resulting from fuel that enters inlet 46.

As with reference to FIG. 2, the inlet 46 defines an internal annular surface 52. A generally cylindrical orifice disc 54 is provided at the inlet 46, with a peripheral surface 56 thereof engaged, preferably in a press-fit manner, with the annular surface 52. The orifice disc 54 includes at least one orifice 58 there-through of certain diameter so as to provide an additional pressure drop at the inlet 46, preventing certain magnitude (i.e., damaging) fuel pressure pulsations from acting on the diaphragm 12. Thus, high frequency and/or high amplitude pressure pulsations are by-passed due to the orifice 58, preventing the diaphragm 12 and the damper 10' from permanent damage and functional loss. A plurality of orifices 58 are shown in the embodiment. However, a single 1 mm diameter orifice 58 that is 3.5 mm long has proven to create an appropriate pressure drop.

In the embodiment, the orifice disc 54 is provided and can be changed with a different orifice disc having different sized and/or number of orifice(s) 58 thereby finely tuning the orifice(s) to dampen particular ranges of pressure pulsations/frequencies. Although an orifice disc 54 is shown, it can be appreciated that instead of providing the orifice disc 54, the housing 15 and the inlet 46 alone can be configured to define the at least one orifice 58. The orifice size and length can be engineered to individual applications depending on the fuel system. This gives the systems engineer flexibility to calibrate a balance between damping performance and the bypass of damaging pulsations.

In the normal position of the damper 10' as shown in FIG. 2, the spring 14 pushes against the spring cup 34 and thus the diaphragm 12 is biased towards the inlet 46, with the central portion 36 of the diaphragm 12 engaging the spacer 40. In the normal position, a certain volume is defined in the lower chamber 50. The spring cup 34 is constructed and arranged to be self-centering, thus eliminating the need for additional components to position it within the interior space 26. The configuration of the spring cup 34 also eliminates the need for a central cut in the diaphragm 12. Thus, the central portion 36 of the diaphragm 12 may be entirely solid. The spacer 40, resting against surface 42 of the housing 15, maintains a balance point in the normal position of the damper 10'.

In an operating position of the damper 10', the diaphragm 12 alone, or in combination with the spring 14 works against or dampens any fuel pressure pulsations received through the orifice 58 due to varying the volume of the lower chamber 50.

Thus, the orifice(s) 58 protects the damper 10' from exposure to a wide engine operating range of pressure and frequency and thus increases the life and reliability of the damper 10'.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A fuel pressure damper comprising:
    a housing defining an inlet constructed and arranged to receive fuel,
    an orifice disc at the inlet, the orifice disc including at least one orifice there-through,
    a cover coupled to the housing to define an interior space, the orifice disc being interchangeable with a different orifice disc having different sized and/or number of orifice(s),
    a flexible diaphragm having a periphery fixedly secured to at least the housing or the cover and having a freely movable central portion that divides the interior space into first and second isolated chambers, the at least one orifice communicating with the second chamber, and
    a compression spring in the first chamber and disposed between a spring receiving structure and the cover, the spring biasing the spring receiving structure and thus the diaphragm to a normal position thereby defining a volume in the second chamber, and in an operating position, the central portion of the diaphragm alone, or in combination with the spring, is constructed and arranged to dampen fuel pressure pulsations in the second chamber by varying the volume of the second chamber,
    wherein the at least one orifice has a diameter and length to ensure that pressure pulsations of a certain magnitude are prevented from entering the second chamber.

2. The damper of claim 1, wherein the inlet has an internal annular surface, and wherein the orifice disc is generally cylindrical having a peripheral surface engaged with the internal annular surface.

3. The damper of claim 1, wherein the peripheral surface is engaged with the internal annular surface in a press-fitted manner.

4. The damper of claim 1, wherein a plurality of orifices are provided through the orifice disc.

5. The damper of claim 1, wherein the central portion of the diaphragm is entirely solid.

6. The damper of claim 1, wherein the diaphragm is generally flat and includes nitrile rubber.

7. The damper of claim 1, wherein the spring is a coil spring.

8. The damper of claim 1, wherein the housing includes an annular flange and the cover includes an annular shoulder coupled to the annular flange.

9. The damper of claim 8, wherein the periphery of the diaphragm is annular and is fixedly secured between the flange and the shoulder.

10. The damper of claim 1, wherein the spring receiving structure comprises a spring cup in the first chamber engaged with the central portion of the diaphragm, and wherein the spring is a coil spring having first and second ends, the first end of the spring is engaged with a portion of the cover and the second end of the spring is received in the spring cup.

11. The damper of claim 10, wherein the portion of the cover is a detent in the cover.

12. The damper of claim 1, further comprising a spacer, separate from the orifice disc, in the interior space adjacent to the inlet and between the diaphragm and the orifice disc, the central portion of the diaphragm engaging the spacer in the normal position.

13. A method of preventing certain magnitude fuel pressure pulsations from entering a fuel pressure damper of a vehicle fuel system, the method comprising:
    providing a fuel pressure damper having an inlet,
    providing an orifice disc, including at least one orifice there-through, in the inlet interchangeable with a different orifice disc having different sized and/or number of orifice(s) removable from the inlet, selecting a size and length of the at least one orifice to create a pressure drop at the inlet to prevent the certain magnitude fuel pressure pulsations from entering the damper.

14. The method of claim 13, wherein the inlet has an internal annular surface, and wherein the orifice disc is generally cylindrical having a peripheral surface, and wherein the step of providing the orifice disc includes press-fitting the orifice disc into the inlet so that the peripheral surface is engaged with the internal annular surface.

15. The method of claim 13, wherein a plurality of orifices are provided in the orifice disc.

16. The method of claim 13, wherein the damper includes a flexible diaphragm in fluid communication with the at least one orifice.

17. The method of claim 16, wherein the diaphragm is generally flat and includes nitrile rubber.

18. The method of claim 16, wherein the diaphragm divides an interior space of the damper into first and second isolated chambers, a compression spring being provided in the first chamber biasing the diaphragm towards the inlet, the second chamber being in fluid communication with the at least one orifice.

19. The damper of claim 1 wherein the at least one orifice has a diameter of about 1 mm and a length of about 3.5 mm.

20. The method of claim 13 wherein a diameter of the at least one orifice is selected to be of about 1 mm and a length of the at least one orifice is selected to be about 3.5 mm.

* * * * *